United States Patent [19]

Takiyama et al.

[11] Patent Number: 5,436,056
[45] Date of Patent: Jul. 25, 1995

[54] METHOD OF PRODUCING A HIGH MOLECULAR WEIGHT ALIPHATIC POLYESTER AND FILM THEREOF

[75] Inventors: Eiichiro Takiyama, Kamakura; Yoshitaka Hatano, Higashikanbara; Takashi Fujimaki, Yokohama; Shigekatu Seki; Takao Hokari, both of Takasaki; Tadayuki Hosogane, Yokohama; Noriaki Harigai, Hasuda, all of Japan

[73] Assignee: Showa Highpolymer Co., Ltd., Tokyo, Japan

[21] Appl. No.: 107,776

[22] PCT Filed: Dec. 21, 1992

[86] PCT No.: PCT/JP92/01671

§ 371 Date: Aug. 18, 1993

§ 102(e) Date: Aug. 18, 1993

[87] PCT Pub. No.: WO93/13152

PCT Pub. Date: Jul. 8, 1993

[30] Foreign Application Priority Data

Dec. 20, 1991 [JP] Japan .................. 3/338499
Dec. 20, 1991 [JP] Japan .................. 3-338500
Dec. 27, 1991 [JP] Japan .................. 3-346385
Dec. 27, 1991 [JP] Japan .................. 3-346386
Feb. 28, 1992 [JP] Japan .................. 4-043674
Feb. 28, 1992 [JP] Japan .................. 4-043675
Apr. 15, 1992 [JP] Japan .................. 4-095424

[51] Int. Cl.⁶ .......................... D06N 7/04
[52] U.S. Cl. .................... 428/141; 528/272; 528/296; 528/300; 528/302; 528/307; 525/437; 525/440

[58] Field of Search ............ 528/272, 296, 300, 302, 528/307; 525/437, 440; 428/141

[56] References Cited

U.S. PATENT DOCUMENTS 5,306,787 4/1994 Takiyama et al. .............. 525/440

FOREIGN PATENT DOCUMENTS 0424745 2/1991 European Pat. Off.
WO-A8911497 11/1989 WIPO.

*Primary Examiner*—Samuel A. Acquah
*Attorney, Agent, or Firm*—Sughrue, Mion, Zinn, Macpeak & Seas

[57] ABSTRACT

A method for producing a high molecular weight aliphatic polyester, wherein:

(A) 100 parts by weight of polyester (a) with a number average molecular weight of at least 10,000, and a weight average molecular weight of at least 30,000, and with end-groups that are substantially hydroxyl groups, and with a melting point of at least 60° C., the polyester (a) having been obtained by reacting the following three ingredients: (i) a glycol ingredient; (ii) an aliphatic dicarboxylic acid ingredient; and (iii) a trifunctional or tetrafunctional ingredient reacts with (B) 0.1–3 parts by weight of a poly-isocyanate in a melted state of the polyester (a).

The method provides a high molecular weight aliphatic polyester which has good properties and a melt viscosity required for molding and forming and has a wide molecular weight distribution. The high molecular weight aliphatic polyester is applicable to a variety of fields, such as films, moldings and formings, fibers, etc.

7 Claims, No Drawings

METHOD OF PRODUCING A HIGH MOLECULAR WEIGHT ALIPHATIC POLYESTER AND FILM THEREOF

TECHNICAL FIELD

The present invention relates to a method of producing a high molecular weight aliphatic polyester and, more particularly, to a method of producing a high molecular weight aliphatic polyester having a wide range of molecular weight distribution which is suitable for various applications, such as films, moldings, and fiber.

BACKGROUND ART

Known condensation-polymerized aliphatic polyesters, even one having a molecular weight (hereinafter, "molecular weight" means "number average molecular weight" unless stated otherwise) of about 15,000, do not have as good as properties as are possessed by polyesters having aromatic structures, such as polyethylene terephthalate (hereinafter, referred to as "PET"). It is very difficult to increase the molecular weight of an aliphatic polyester over 15,000 because further growth reaction is surpassed by decomposition reaction due to the poor heat stability of aliphatic polyesters.

Further, most aliphatic polyesters have melting points of 100° C. or lower, and it would be no exaggeration to say that the range of the molecular weights thereof achieved by condensation polymerization are far from the range desirable for practical use.

Polyesters conventionally used in the polyurethane industry as raw materials for various products including moldings, formings, paints, adhesives, rigid and flexible foams, rubbers, etc., are substances more like oligomers (hereinafter, referred to as "prepolymers") having molecular weights of 1,000–3,000 and a hydroxyl number of about 50–150. Therefore, a large amount of diisocyanate, that is, 7–30 parts by weight per 100 parts by weight of polyester, must be used to achieve properties thereof suitable for practical use. However, if such a large amount of diisocyanate is used, that is, if the concentration of diisocyanate groups is significantly high, a mixture of polyester and diisocyanate of any mixing ratio always gels at a temperature of 100° C. or higher, thus failing to provide a desirable product.

For example, when producing a molding by the foam or resin injection method, if polyester is mixed immediately before injection into a mold, with a liquid polyol ingredient, an isocyanate ingredient (including prepolymer type isocyanate) and a catalyst for promoting the reaction, the mixture gels and cures in a short time immediately after being injected into the mold, without forming a stable intermediate product. The resulting cure resin becomes a crosslinked type.

Isocyanate is used in products produced in the polyurethane industry as follows. For example, masked isocyanate is contained in such heat-setting type products as paints, adhesives or the like. When heated, the isocyanate is regenerated and thereby cures the products. Moisture-setting type products contain isocyanate groups at the ends of the ingredient prepolymer. It is believed that when subjected to moisture, the isocyanate groups form urethane bonds, to which another isocyanate group binds, thus curing.

Production of polyurethane rubber does not directly use isocyanate, but uses polyester prepolymers having isocyanate groups at the end thereof and, further, diols or diamines selected according to the properties, of the rubber. If isocyanate is directly reacted with polyester prepolymers, partial gelation results, thus inevitably degrading the properties required for rubber.

Fibers are produced in a manner similar to the above description although they are not simple polyesters or polyethers but so-called segmented type polymers. Similar to the above products, these polymers, both thermosetting type and thermoplastic types, are produced by using prepolymers and large amounts of isocyanates corresponding to the prepolymers.

The above products inevitably have many urethane bonds when the final structure of polyurethanes is formed. For example, if a prepolymer having a molecular weight of 2,000 is used to form polyurethanes, theoretically, a resultant polyurethane having a molecular weight of 10,000 is estimated to have 8–10 urethane bonds, and a resultant polyurethane having a molecular weight of 30,000 is estimated to have about 30 urethane bonds.

The present inventors have studied the enhancement of the molecular weight of aliphatic polyester in order to obtain a film formed mainly of a biodegradable plastic, and have found that polyesters, such as conventional polyurethane resins, which have high concentrations of urethane bonds in their molecules are not very suitable for films.

For example, if a crystalline polyester synthesized from 1,4-butanediol and succinic anhydride by a conventional method has a high concentration of urethane bonds, it becomes rigid and hard to stretch and, therefore, unsuitable for films.

An object of the present invention is to provide a method for producing a high molecular weight aliphatic polyester which eliminates the above-stated problems of the conventional art and is suitable for various uses, such as films, moldings, formings, fibers, etc.

DISCLOSURE OF THE INVENTION

After intensive study, the present inventors have solved the above problems. Accordingly, the present invention provides a method for producing a high molecular weight aliphatic polyester having a wide range distribution of molecular weight and a film formed of the high molecular weight aliphatic polyester, the method being characterized by reacting (A) 100 parts by weight of a polyester (a) with a number average molecular weight of at least 10,000, a weight average molecular weight of at least 30,000, with end-groups that are substantially hydroxyl groups, and with a melting point of at least 60° C., the polyester (a) having been obtained by reacting the following three ingredients:
 (i) a glycol ingredient;
 (ii) an aliphatic (including cyclic type) dicarboxylic acid (or an acid anhydride thereof) ingredient; and
 (iii) at least one polyfunctional ingredient selected from the group consisting of trifunctional and tetrafunctional polyhydricalcohols, oxycarboxylic acids and polybasiccarboxylic acids (or acid anhydrides thereof); with (B) 0.1–3 parts by weight of a poly-isocyanate, in a melt stage at a temperature equal to or higher than the melting point of the polyester (a).

The present invention will be further described in detail hereinafter.

To achieve a high melt viscosity required for forming a film or producing a molding and to increase the ratio of the weight average molecular weight to the number average molecular weight {Mw (weight average molecular weight)/Mn (number average molecular weight)} as much as possible, the present invention is characterized by adding 0.1-3 parts, more preferably, 0.5-2 parts, by weight of a poly-isocyanate to 100 parts by weight of a polyester whose number average molecular weight is at least 10,000, more preferably, at least 20,000, and whose weight average molecular weight is at least 30,000, more preferably, at least 60,000, and whose end-groups are substantially hydroxyl groups, the polyester having been obtained by reacting a glycol ingredient and an aliphatic (including cyclic type) dicarboxylic acid (or an acid anhydride thereof) ingredient, in a melt state at a temperature equal to or higher than the melting point of the polyester.

Use of a suitable amount of a polyfunctional ingredient will achieve a branched structure in the resulting polyester and, in cooperation with the addition and reaction of a polyisocyanate, increase the weight average molecular weight significantly over the number average molecular weight.

The present inventors have found that a high molecular weight aliphatic polyester which achieves the above-stated objects can be obtained, unlike the conventional polyurethane, by melt-mixing a polyester having number average and weight average molecular weights preferably increased as much as possible to at least 10,000 and 30,000, respectively, and a reduced number of end-groups, with a small amount of an isocyanate corresponding to the reduced number of end-groups, thereby achieving the present invention.

The main feature of the present invention is that the polyester molecules have very few urethane bonds. In theory, the molecules have one urethane bond per molecular weight of 10,000. As stated above, good film properties are difficult to achieve if the molecules do not have such a low urethane bond concentration.

The reasons for using a polyfunctional ingredient are as follows:

(i) To increase the molecular weight of the polyester as much as possible:

It is not easy to achieve a number average molecular weight of polyester of at least 15,000 by ordinary condensation polymerization.

However, the use of a polyfunctional ingredient facilitates achieving a number average molecular weight of at least 20,000 and a weight average molecular weight of at least 60,000.

(ii) To increase the Mw/Mn ratio:

Formation of a film requires a large Mw/Mn ratio, that is, a large ratio of the weight average molecular weight (Mw) to the number average molecular weight (Mn). A polyfunctional ingredient makes it possible to achieve such requirement. According to the present invention, an aliphatic polyester having a Mw/Mn ratio of at least 3, more preferably, at least 6, can be easily produced.

To eliminate a possibility of gelation, the suitable amount of a polyfunctional ingredient added is as follows: the amount of a trifunctional ingredient is 0.1-5 mol %; and the amount of a tetrafunctional ingredient is 0.1-3 mol % when the total amount of the aliphatic dicarboxylic acid (or a acid anhydride thereof) ingredient is assumed to be 100 mol %.

Glycol Ingredient

The glycol ingredients generally suitable for the present invention to achieve a melting point of the polyester of at least 60° C. are: ethylene glycol, 1,4-butanediol, 1,6hexanediol, 1,4-cyclohexanedimethanol, etc. Ethylene glycol and 1,4-butanediol are particularly suitable.

Dicarboxylic Acid Ingredient

An aliphatic (including cyclic type) dicarboxylic acid (or an acid anhydride) ingredient having even numbers of methylene groups between carboxyl groups is suitable for the present invention to achieve a melting point of at lowest 60° C.

Examples of such an aliphatic dicarboxylic acid ingredient are: succinic acid, adipic acid, suberic acid, sebacic acid, didodecanoic acid, succinic anhydride, etc. Of course, a combination of any of these substances may be used.

To achieve a polyester whose end-groups are substantially hydroxyl groups, the amount of the glycol ingredient used is preferably larger, for example, by 5-20%, than the amount of the aliphatic dicarboxylic acid used.

Polyfunctional Ingredient

Examples of a polyfunctional ingredient characterizing the present invention are: trifunctional or tetrafunctional polyalcohol, oxycarboxylic acid and polycarboxylic acid.

Typical examples of the trifunctional polyalcohol are: trimethylolpropane, glycerine, and anhydrides thereof. A typical example of the tetrafunctional alcohol is pentaerythritol.

The trifunctional oxycarboxylic acid ingredients fall into two types:

(i) a type having two carboxyl groups and a hydroxyl group in a molecule; and (ii) the other type having a carboxyl group and two hydroxyl groups.

Malic acid (the following formula)

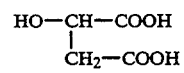

, belonging to the type (i) having two carboxyl groups and a hydroxyl group in a molecule, is practically advantageous because a commercial product thereof is inexpensive and easily available. Malic acid is good enough to achieve the objects of the present invention.

The tetrafunctional oxycarboxylic acid ingredients characterizing the present invention fall into the following three types:

(i) a type having three carboxyl groups and one hydroxyl group in a molecule;

(ii) a type having two carboxyl groups and two hydroxyl groups in a molecule; and (iii) a type having three hydroxyl groups and one carboxyl group in a molecule.

Although any of the three types is suitable, citric acid (the following formula)

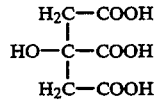

and tartaric acid (the following formula)

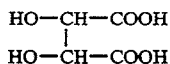

are practically advantageous because commercial products thereof are inexpensive and easily available. Citric acid and tartaric acid are good enough to achieve the objects of the present invention.

Examples of a suitable trifunctional polycarboxylic acid (or an acid anhydride thereof) ingredient are trimesic acid, propane tricarboxylic acid, etc. However, trimellitic anhydride is practically advantageous and good enough to achieve the objects of the present invention.

The tetrafunctional polycarboxylic acids fall into various types including aliphatic, cyclic aliphatic and aromatic types, according to literature. However, commercial products of pyromellitic anhydride, benzophenonetetracarboxylic anhydride, cyclopentanetetracarboxylic anhydride and the like are easily available. These anhydrides are good enough to achieve the objects of the present invention.

The preferred amount of a polyfunctional ingredient is as follows: the amount of a trifunctional ingredient is in the range between 0.1 and 5 mol %; and the amount of a tetrafunctional ingredient is in the range between 0.1 and 3 mol % when the mole numbers of the glycol ingredient or aliphatic (including cyclic type) dicarboxylic acid (or an acid anhydride thereof) ingredient is assumed to be 100 mol %.

If the amount of a trifunctional ingredient used is larger than 5 mol %, the possibility of gelation during the esterification reaction is significantly increased. An amount smaller 0.1 mol % fails to achieve the practical effects of its use.

A preferable amount of a trifunctional oxycarboxylic acid ingredient is 0.5–3 mol %.

If the amount of a tetrafunctional ingredient used is larger than 3 mol %, the possibility of gelation during the esterification reaction is significantly increased. An amount smaller 0.1 mol % fails to achieve the practical effects of its use.

A preferable amount of a tetrafunctional acid ingredient is 0.2–2 mol %.

Polyester Synthesis

Synthesis of a polyester is generally performed by esterification and glycol-eliminating reaction of the above ingredients. The suitable conditions for the esterification are a temperature of 180°–230° C. and a reaction time of 4–16 hours. The acid value is preferably 30 or lower. Suitable conditions for the glycol-eliminating reaction are a temperature of 180°–230° C., a reaction time of 2–16 hours and a pressure of about 1 Torr or lower. The suitable catalyst for the glycol-eliminating reaction is an inorganic or organic metallic compound, for example: an alkoxide, an organic acid salt, a chelate, an oxide or the like of a metal. The preferred catalyst is an organic compound of titanium, for example: tetraisopropyl titanate or titanium oxyacetylacetonate.

The preferred amount of an organic compound of titanium is such that the corresponding amount of titanium metal is 0.001–0.1 part by weight per 100 parts by weight of the polyester. The resulting polyester (a) needs to have a number average molecular weight of at least 10,000 and a weight average molecular weight of at least 30,000. If the number average molecular weight is lower than 10,000, the amount of polyisocyanate added is increased, thereby drastically increasing the possibility of gelation.

Addition of Isocyanate

A poly-isocyanate is added to the thus-obtained polyester (a) whose number average molecular weight is at least 10,000, preferably, at least 20,000, and whose weight average molecular weight is at least 30,000, preferably, at least 60,000, and whose end-groups are substantially hydroxyl groups, in order to further increase the molecular weight. Any poly-isocyanate commercial product easily available may be used without any particular restriction. Examples of such a poly-isocyanate are: 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, xylylene diisocyanate hydride, hexamethylene diisocyanate, and isophorone diisocyanate. Particularly, hexamethylene diisocyanate is preferable, considering the color of the resulting resin and the reactivity when added to the polyester. Further, trifunctional type isocyanates may be used, for example, a trimer of hexamethylene diisocyanate or triphenylmethane triisocyanate.

Although the suitable amount of a poly-isocyanate added varies depending on the molecular weight of the polyester (a), the suitable amount thereof is by weight 0.1–3 parts, preferably, 0.5–2 parts, per 100 parts of the polyester. If the amount of poly-isocyanate added..is less than 0.1 part by weight, the advantages of the present invent,ion can not be achieved. If it is larger than 3 parts by weight, the possibility of gelation is increased.

The poly-isocyanate is added preferably under conditions where the polyester is homogeneously melted, does not contain a solvent and is easy to stir. In short, it is added preferably at a temperature between 150° C. and 250° C., although the suitable temperature may vary depending on the melting point of the polyester. Alternatively, it is possible to add it to the polyester in the form of solid and melt and mix it by means of an extruder. However, it is more practical to add it into a polyester producing apparatus or the polyester in the form of melt (e.g., the polyester in a kneader).

Other Additives

When the high molecular weight aliphatic polyester of the present invention having urethane bonds and a branched structure is used for practical application, it may naturally be used together with a reinforcement, a filler, a colorant, a stabilizer, a lubricant, etc., according to the needs.

Formation of a Film

The high molecular weight aliphatic polyester of the present invention having urethane bonds and a branched structure is formed into a film or a sheet by various forming methods such as a film blowing method or a T-die method. In this specification, "film" includes films and sheets.

To form a uniaxially or biaxially stretched film from a high molecular weight aliphatic polyester having urethane bonds and a branched structure, the polyester is extruded from an ordinary T-die or an annular die at 170°–200° C. into a flat or tubular form. Then, the obtained product is stretched uniaxially or biaxially. For uniaxial stretching, a film or sheet-like product is stretched in the extrusion direction by, for example, calendering rollers, or perpendicularly to the extrusion direction by, for example, a tenter. A tubular product is stretched in the extrusion direction or along the circumference.

For biaxial stretching, a film or sheet-like product is stretched lengthwise by, for example, rollers, and then stretched widthwise by, for example, a tenter. A tubular product is stretched simultaneously or sequentially in the extrusion direction and along the circumference thereof, that is, perpendicularly to the axis of the tube.

A suitable stretching temperature is selected in the range between room temperature and 90 degrees, according to need. The stretching ratio is suitably determined according to intended use.

A uniaxially or biaxially stretched film formed of a polyester having a branched structure and urethane bonds according to the present invention is very tough and suitable for wrapping film and agricultural mulching film. Further, the film of the present invention is biodegradable.

THE BEST MODE FOR CARRYING OUT THE INVENTION

More specific illustrations of the present invention will be described hereinafter in the following examples.

EXAMPLE 1

300 g of 1,4-butanediol, 300 g of succinic anhydride, 7 g of trimethylolpropane (about 1.5 mol % of the amount of the succinic anhydride) and 0.6 g of tetraisopropyl titanate were placed in a 1-liter separable flask provided with a stirrer, a reflux condenser, a thermometer and a gas introducing pipe. After esterification was performed at 205°–210° C. in an atmosphere of nitrogen gas to achieve an acid value of 7.1, glycol elimination was performed at 215°–220° C. for 5 hours while the pressure was being reduced to a final pressure of 0.5 torr, thus obtaining a white wax-like polyester (a) having a melting point of 112°–113° C., a weight average molecular weight (Mw) of 80,400 and a number average molecular weight (Mn) of 22,900 (Mw/Mn=3.5).

After 300 g of the polyester (a) was melted at 205° C., 4 g of hexamethylene diisocyanate was added thereto. As a result, viscosity rapidly increased, but no gelation occurred.

The thus-obtained high molecular weight aliphatic polyester (A) according to the present invention having a few urethane bonds was white crystals which exhibited a somewhat ivory color and had a melting point of 112°–114° C., a weight average molecular weight of 305,000 and a number average molecular weight of 42,800 and, therefore, Mw/Mn=7.1.

It is believed that these features are advantageous for forming a film. Melt flow measurement of the polyester (A) was performed according to the method described in JIS-K-7210A. When the load was 2.16 kg, substantially no elution was observed at 190° C. in 10 minutes.

The polyester (A) was press-formed and then uniaxially stretched by three times to obtain a film having a thickness of about 40μ. The obtained film was very tough. The tensile strength thereof was 13.9–15.7 Kg/mm$^2$.

The molecular weight was determined by GPC (the same method was also employed in the following examples).

| | |
|---|---|
| Apparatus Used | Shodex GPC SYSTEM-11 (Showa Denko KK) |
| Polymer Solution | 0.1% by weight |
| Eluent | 5 mM CF$_3$COONa/HFIP (hexafluoroisopropanol) |
| Column | Sample Column (HFIP-800P and HFIP-80Mx2) Reference Column (HFIP-800Rx2) |
| Column Temperature | 40° C. |
| Pressure | 30 kg/cm2 |
| Detector | Shodex RI |
| Standard | PMMA (Shodex STANDARD M-75) |

EXAMPLE 2

205 g of ethylene glycol, 4 g of trimethylolpropane (1 mol %), 354 g of succinic acid and 0.06 g of tetraisopropyl titanate were placed in a 1-liter separable flask provided with a stirrer, a reflux condenser and a thermometer. After esterification was performed at 200°–205° C. in an atmosphere of nitrogen gas to achieve an acid value of 7.8, glycol elimination was performed at 210°–215° C. for 4 hours while the pressure was being reduced to a final pressure of 0.5 Torr.

As a result, a polyester (b) having a melting point of about 87° C., a number average molecular weight (Mn) of 17,000 and a weight average molecular weight (Mw) of 53,000 was obtained. The acid value thereof was substantially zero. Based on such an acid value and infrared analysis, all the end-groups were considered to be hydroxyl groups.

After about 450 g of the total amount of the polyester (b) was heated to 210° C., 6 g of hexamethylene diisocyanate was added thereto. As a result, the viscosity was rapidly increased, but no gelation occurred. The thus-obtained polyester (B) having a few urethane bonds was a light ivory color wax-like substance and had a melting point of about 90° C., a number average molecular weight of 30,100 and a weight average molecular weight of 120,000. Therefore, the Mw/Mn was about 4.0.

COMPARATIVE EXAMPLE 1

A polyester (b) was obtained by the reactions under the same reaction conditions as in Example 1, except that trimethylolpropane was not used. The polyester (b) had a number average molecular weight of 12,000 and a weight average molecular weight of 30,000. This polyester was mixed with the same amount of hexamethylene diisocyanate as in Example 1. The thus-obtained polyester (B) having urethane bonds had a number average molecular weight of 25,000 and a weight average molecular weight of 69,000. Therefore, the Mw/Mn was only about 2.8.

Flow Test

The MFR (melt flow rate) was measured under conditions where the load was 0.325 Kg and the temperature was 190° C., by method described in JIS-K-7210A. As a result, whereas the entire polyester (B) containing urethane bonds was eluted and no portion thereof remained, 3.18 g of the polyester (B) having a branched structure was eluted in a designated time of 10 minutes, thus exhibiting good characteristics.

EXAMPLE 3

300 g of 1,4-cyclohexanedimethanol, 190 g of succinic anhydride, 23 g of didodecanoic acid, 2.3 g of pentaerythritol, (0.8 mol % of the total amount of the succinic anhydride and the didodecanoic acid) and 0.3 g of titanium oxyacetylacetonate were placed in a 1-liter separable flask provided with a stirrer, a reflux condenser, a thermometer and a gas introducing pipe. After esterification was performed at 200°–205° C. in an atmosphere of nitrogen gas to achieve an acid value of 5.9, glycol elimination was performed at 215°–220° C. for 8 hours while the pressure was being reduced to a final pressure of 0.5 Torr, thus obtaining a light ivory-color white crystalline polyester (c) having a melting point of 110°–112° C., a weight average molecular weight (Mw) of 109,000 and a number average molecular weight (Mn) of 25,000 (Mw/Mn =4.2). The molecular weight were determined in generally the same manner as in Example 1.

After 300 g of the polyester (c) was melted at 205° C., 5 g of isophorone diisocyanate was added thereto. As a result, the viscosity was rapidly increased, but no gelation occurred. The thus-obtained high molecular weight aliphatic polyester (C) according to the present invention containing a few urethane bonds exhibited a light yellow color and had a melting point of about 115° C., a weight average molecular weight (Mw) of 339,000 and a number average molecular weight (Mn) of 47,000 and, therefore, Mw/Mn=7.2.

The polyester (C) was press-formed and then uniaxially stretched by four times to obtain a film having a thickness of about 50μ. The obtained film was very tough. The tensile strength thereof was 13.1–15.3 Kg/mm$^2$. Further, the film was buried under 10 cm of kuroboku soil for a test. After it was kept in the soil at 25° C. for four months, the film surface significantly vermiculated, thus confirming its biodegradability.

EXAMPLE 4

205 g of ethylene glycol, 300 g of succinic anhydride, 4 g of glycidol (about 1.7 mol % of the amount of the succinic anhydride) and 0.5 g of tetraisopropyl titanate were placed in a 1-liter separable flask provided with a stirrer, a reflux condenser, a thermometer and a gas introducing pipe. After esterification was performed at 190°–200° C. in an atmosphere of nitrogen gas to achieve an acid value of 7.1, glycol elimination was performed at 215°–220° C. for 9 hours while the pressure was being reduced to a final pressure of 0.6 Torr, thus obtaining a white wax-like polyester (d) having a melting point of 98°–99° C., a weight average molecular weight (Mw) of 95,700 and a number average molecular weight (Mn) of 25,500 (Mw/Mn=3.8). The molecular weight was determined in generally the same manner as in Example 1. 300 g of the polyester (d) was melted at 205° C., and 5 g of diphenylmethane diisocyanate was added thereto. As a result, the viscosity rapidly increased, but no gelation occurred.

The thus-obtained high molecular weight aliphatic polyester (D) according to the present invention having a few urethane bonds was a light yellowish brown wax-like substance which had a melting point of about 100° C., a weight average molecular weight of 358,000 and a number average molecular weight of 49,100 and, therefore, Mw/Mn=7.3.

It is believed that these features are advantageous for forming a film. Melt flow measurement of the polyester (A) was performed according to the JIS-K-7210A method. When the load was 2.16 Kg, the flow rate at 125° C. was at most 0.1 g/10 minutes. The polyester (D) was press-formed and then biaxially stretched by three times along each axis to obtain a film having a thickness of about 40 μ. The obtained film was very tough. The tensile strength thereof was 14.7–16.1Kg/mm$^2$.

EXAMPLE 5

200 g of ethylene glycol, 4 g of pentaerythritol (about 1 mol%), 354 g of succinic acid and 0.05 g of tetraisopropyl titanate were placed in a 1-liter separable flask provided with a stirrer, a reflux condenser, a thermometer and a gas introducing pipe. After esterification was performed at 200°–205° C. in an atmosphere of nitrogen gas to achieve an acid value of 8.1, glycol elimination was performed at 210°–215° C. for 4 hours while the pressure was being reduced to a final pressure of 0.5 Torr.

As a result, a polyester (e) having a number average molecular weight (Mn) of 18,100 and a weight average molecular weight (Mw) of 88,000 was obtained. 300 g of the polyester (e) was heated to 215° C., and 6 g of hexamethylene diisocyanate was added thereto. As a result, the viscosity rapidly increased, but no gelation occurred.

The thus-obtained polyester (E) having urethane bonds and a branched structure was a light ivory-color wax-like substance and had a melting point. of 95° C., a number average molecular weight of 41,000 and a weight average molecular weight of 244,000. Therefore, Mw/Mn was about 6.0.

As a comparative example, a polyester (E) having urethane bonds but no branched structure was synthesized under the same conditions as in this example, except that pentaerythritol was not used. The polyester (E) had a number average molecular weight of 31,000 and a weight average molecular weight of 89,000. Mw/Mn was about 2.9.

As a result of melt flow measurement according to JIS-K7210A, when the temperature was 190° C. and the load was 0.325 kg, 1.86 g of the polyester (E) was eluted whereas the entire polyester (E) was eluted, thus exhibiting vastly different melt flow values.

Further, a film forming test was performed. Because this test requires a relatively large amount of a sample, an amount equivalent to several batches used in the above condensation polymerization test was used (generally the same amount of a sample was used in the following tests).

The polyester (E) was formed into a film having a thickness of 70μ. at 200° C. by the T-die method, and then uniaxially stretched by three times at 50° C. The resultant film had a tensile strength of 13.7 Kg/mm$^2$, and was so tough that it could not be torn by hand.

On the other hand, a film formed of the polyester (e) by the T-die method ruptured while being rolled up. Thus, a desirable film could not be obtained.

EXAMPLE 6

200 g of 1,4-butanediol, 460 g of didodecanoic acid, 3 g of pentaerythritol (about 0.8 mol %) and 0.06 g of tetraisopropyl titanate were placed in a 1-liter separable flask provided with a stirrer, a reflux condenser, a thermometer and a gas introducing pipe. After esterification was performed at 200°–205° C. in an atmosphere of nitrogen gas to achieve an acid value of 6.4, glycol elimination was performed at 215°–220° C. for 6 hours while the pressure was being reduced to a final pressure of 0.6 Torr, thus obtaining a polyester (f) having a number average molecular weight of 15,700 and a number average molecular weight of 88,000. Subsequently, 8 g of isophorone diisocyanate was added to the polyester (f) at 210° C. As a result, the viscosity rapidly increased, but no gelation occurred.

The thus-obtained polyester (F) having urethane bonds and a branched structure was a light yellowish brown wax-like substance and had a melting point of, about 72° C., a number average molecular weight of 38,000 and a weight average molecular weight of 211,000. Therefore, the Mw/Mn was about 5.6. As a comparative example, a polyester (F') having urethane bonds but no branched structure was synthesized under the same conditions as described above, except that pentaerythritol was not used. The polyester (F') had a number average molecular weight of 31,000 and a weight average molecular weight of 89,000. The Mw/Mn was about 2.9. The melt flow values of the two polyesters (F) and (F') were determined under the conditions where the temperature was 190° C. and the load was 2.16 kg. The melt flow value of the polyester (F) was 0.01 g/10 min. whereas the melt flow value of the polyester (F) was 4.2 g. Thus, there was a large difference between the two values.

The polyesters were press-formed into films having thicknesses of 75–80μ. at 170° C. and then stretched by four times. A film formed of the polyester (F) was very tough, having a tensile strength of 13.1Kg/mm$^2$.

On the other hand, a film formed of the polyester (f) ruptured while being stretched. Thus, the strength test thereof could not be performed.

EXAMPLE 7

205 g of ethylene glycol, 354 g of succinic acid, 8 g of malic acid (2 mol %) and 0.06 g of tetraisopropyl titanate (about 30 ppm titanium metal) were placed in a 1-liter separable flask provided with a stirrer, a reflux condenser, a thermometer and a gas introducing pipe. After esterification was performed at 200°–205° C. in an atmosphere of nitrogen gas to obtain a polyester having an acid value of 5.6 and a number average molecular weight of 5,600, glycol elimination was performed at 220° C. for 3 hours while the pressure was reduced to 0.7–0.5 Torr, thus obtaining a white wax-like polyester (g) having a melting point of about 97° C., a number average molecular weight of 29,200 and a weight average molecular weight of 90,700. The Mw/Mn was about 3.1.

500 g of the polyester (g) was heated to 210°–215° C. and melted in a heating kneader, and 6 g of hexamethylene diisocyanate (1.2 phr) was added to the melt while the melt was being stirred. As a result, the viscosity was rapidly increased, but no gelation occurred. The thus-obtained polyester (G) having urethane bonds was a light yellow wax-like substance and had a melting point of about 100° C., a number average molecular weight of 39,300 and a weight average molecular weight of 281,000. Therefore, the Mw/Mn was about 7.2.

As a result of the melt flow measurement defined by JIS-K-7210A, when the amount of a sample was 5 g, the temperature was 190° C. and the load was 0.325 kg, the polyester (G) was eluted at 0.91 g/10 minutes whereas the entire polyester (g) was eluted, thus exhibiting vastly different melt flow values. The polyester (G) was formed into a film having a thickness of 70 at 200° C. by the T-die method, and then uniaxially stretched by three times at 50° C. The resultant film had a tensile strength of 14.4 Kg/mm$^2$, and was so tough that it could not be torn by hand.

On the other hand, a film formed of the polyester (g) by the T-die method ruptured while being rolled up. Thus, a desirable film could not be obtained. A film was press-formed of the polyester (g) at 170° C. so as to achieve a thickness of 75–80μ. This film easily ruptured when stretched. Thus, a stretched film could not be obtained.

EXAMPLE 8

200 g of 1,4-butanediol, 189 g of succinic acid, 58 g of adipic acid, 4.5 g of malic acid (1.5 mol %) and 0.05 g of titanium oxyacetylacetonate (about 18 ppm titanium metal) were placed in a 1-liter separable flask provided with a stirrer, a reflux condenser, a thermometer and a gas introducing pipe.

After esterification was performed at 205°–210° C. in an atmosphere of nitrogen gas to obtain a polyester having an acid value of 9.4 and a number average molecular weight of 6,900, glycol elimination was performed at 215°–220° C. for 4 hours while the pressure was reduced to 0.5–0.6 Torr, thus obtaining a white wax-like polyester (h) having a melting point of about 90° C., a number average molecular weight of 32,000 and a weight average molecular weight of 93,800. The Mw/Mn was about 2.9.

While 500 g of the polyester (h) was heated to 210°–215° C. and melted in a heating kneader, 5 g of isophorone diisocyanate (1 phr) was added to the melt. As a result, the viscosity rapidly increased, but no gelation occurred.

The thus-obtained polyester (H) having urethane bonds was a light yellow wax-like substance and had a melting point of about 94°–95° C., a number average molecular weight of 44,000 and a weight average molecular weight of 317,000. Therefore, the Mw/Mn was about 7.2.

As a result of the melt flow measurement under the conditions where the amount of a sample was 5 g, the temperature was 190° C. and the load was 2.16 kg, the polyester (H) was eluted at 0.01 g/10 minutes or less whereas the polyester (h) was eluted at 4.0 g/10 min.

The polyester (H) was formed into a film having a thickness of 70μ. in generally the same manner as in Example 7, and then stretched by four times at 80° C. The resultant film had a tensile strength of 13.9 Kg/mm$^2$, and was very tough. Further, it was confirmed that film blowing formation of the polyester (H) was possible at 200°–205° C.

On the other hand, film formation using the polyester (h) by the T-die method could not be achieved due to rupture occurring while being rolled up. Thus, a film could not be obtained. A film was press-formed of the polyester (h) at 170° C. so as to achieve a thickness of 75–80μ. The film easily ruptured while being stretched. Thus, a desired film could not be obtained.

EXAMPLE 9

300 g of 1,4-cyclohexanedimethanol (Eastman Chemical, U.S.), 460 g of dodecanoic acid, 9 g of malic acid (about 3 mol %) and 0.07 g of tetrabutyl titanium (about 15 ppm titanium metal) were placed in a 1-liter separable flask provided with a stirrer, a reflux condenser, a thermometer and a gas introducing pipe. After esterification was performed at 210°–215° C. in an atmosphere of nitrogen gas to obtain a polyester having an acid value of 7.8 and a number average molecular weight of 7,900, glycol elimination was performed at 220°–225° C. for 4 hours while the pressure was reduced to 0.5–0.6 Torr.

The thus-obtained polyester (i) was a light ivory-color wax-like substance having a melting point of about 72° C., a number average molecular weight of 28,800 and a weight average molecular weight of 90,200. The Mw/Mn was about 3.2.

500 g of the polyester (i) was heated to 200°–205° C. and melted in a heating kneader, and 7 g of xylylene diisocyanate (1.4 phr) was added to the melt while the melt was being kneaded.

As a result, the viscosity was rapidly increased, but no gelation occurred. The thus-obtained polyester (I) having urethane bonds was a yellowish brown wax-like substance and had a melting point of 77°–78° C., a number average molecular weight of 39,800 and a weight average molecular weight of 300,400. Therefore, the Mw/Mn was about 7.5.

As a result of melt flow measurement under the conditions where the amount of a sample was 5 g, the temperature was 190° C. and the load was 2.16 kg, the polyester (I) was eluted at 0.01 g/10 minutes or less whereas the polyester (i) was eluted at 3.8 g/10 min.

The polyester (I) was press-formed at 170° C. into a film having a thickness of 75–80μ, and then stretched by five times at 50° C. The resultant film had a tensile strength of 12.7 kg/mm². The elongation rate was 90–100 %. On the other hand, a film press-formed of the polyester (h) in generally the same manner as above ruptured wile being stretched. Thus, a desired stretched film could not be obtained.

EXAMPLE 10

205 g of ethylene glycol, 354 g of succinic acid, 6 g (about 1 mol %) of citric acid (containing 1 mol of crystal water) and 0.06 g of tetraisopropyl titanate (about 30 ppm titanium metal) were placed in a 1-liter separable flask provided with a stirrer, a reflux condenser, a thermometer and a gas introducing pipe. After esterification was performed at 200°–205° C. in an atmosphere of nitrogen gas to obtain a polyester having an acid value of 8.6 and a number average molecular weight of 6,300, glycol elimination was performed at 220° C. for 3 hours while the pressure was reduced to 0.5–0.6 Torr.

The thus-obtained polyester (j), was a white wax-like substance having a melting point of 97° C., a number average molecular weight of 30,100 and a weight average molecular weight of 90,600. The Mw/Mn was about 3.0. 500 g of the polyester (j) was heated to 210°–215° C. and melted in a heating kneader, and 6 g of hexamethylene diisocyanate (1.2 phr) was added to the melt while the melt was being stirred.

As a result, the viscosity rapidly increased, but no gelation occurred. The thus-obtained polyester (J) having a branched structure and urethane bonds was a light cream-color wax-like substance and had a melting point of about 100° C., a number average molecular weight of 43,300 and a weight average molecular weight of 330,000. Therefore, the Mw/Mn was about 7.6.

As a result of melt flow measurement according to JIS-K-7210A, under the conditions where the amount of a sample was 5 g, the temperature was 190° C. and the load was 0.325 Kg, the polyester (J) was eluted at 0.39 g/10 minutes or less whereas the entire amount of the polyester (j) was eluted at 4.0/10 min, thus exhibiting a large difference therebetween.

The polyester (J) was formed into a film having a thickness of 70μ at 200° C. by the T-die method, and then uniaxially stretched by three times at 70° C. The resultant film had a tensile strength of 15.1Kg/mm², and was so tough that it could not be torn by hand.

On the other hand, film formation using the polyester (j) by the T-die method could not be achieved due to rupture occurring while being rolled up. Thus, a desired film could not be obtained. A film was press-formed of the polyester (j) at 170° C. so as to achieve a thickness of 75–80μ. The film easily ruptured when stretched. Thus, a stretched film could not be obtained.

EXAMPLE 11

200 g of 1,4-butanediol, 189 g of succinic acid, 58 g of adipic acid, 4.5.g of tartaric acid (about 1 mol %) and 0.05 g of titanium oxyacetylacetonate (about 18 ppm titanium metal) were placed in a 1-liter separable flask provided with a stirrer, a reflux condenser, a thermometer and a gas introducing pipe. After esterification was performed at 205°–210° C. in an atmosphere of nitrogen gas to obtain a polyester having an acid value of 8.1 and a number average molecular weight of 6,600, glycol elimination was performed at 215°–220° C. for 3 hours while the pressure was reduced to 0.5–0.6 Torr, thus obtaining a white wax-like polyester (k) having a melting point of about 90° C., a number average molecular weight of 30,200 and a weight average molecular weight of 91,200. The Mw/Mn was about 3.1.

While 500 g of the polyester (k) was heated to 210°–215° C. and melted in a heating kneader, 5 g of isophorone diisocyanate (1 phr) was added to the melt. As a result, the viscosity rapidly increased, but no gelation occurred.

The thus-obtained polyester (K) having a branched structure and urethane bonds was a yellowish brown wax-like substance and had a melting point of about 94°–95° C., a number average molecular weight of 45,000 and a weight average molecular weight of 309,000. Therefore, the Mw/Mn was about 6.8.

As a result of melt flow measurement under the conditions where the amount of a sample was 5 g, the temperature was 190° C. and the load was 2.16 kg, the polyester (K) was eluted at 0.01 g/10 minutes or less, that is, almost none of the polyester (K) was eluted, whereas the polyester (k) was eluted at 3.8 g/10 min.

The polyester (K) was formed into a film having a thickness of 70μ in generally the same manner as in Example 10, and then stretched by four times at 60° C. The resultant film had a tensile strength of 14.9 kg/mm², and was very tough. Further, it was confirmed that film blowing formation of the polyester (K) was possible at 200°–205° C.

On the other hand, film formation using the polyester (k) by the T-die method could not be achieved due to rupture occurring while being rolled up. Thus, a film could not be obtained. A film was press-formed of the polyester (k) so as to achieve a thickness of 75–80 μ. The film easily ruptured while being stretched. Thus, a desired film could not be obtained.

EXAMPLE 12

300 g of 1,4-cyclohexanedimethanol (Eastman Chemical, U.S.), 189 g of succinic acid, 460 g of dodecanoic acid, 4.5 g of tartaric acid (about 1.5 mol %) and 0.07 g of tetrabutyl titanium (about 15 ppm titanium metal)

were placed in a 1-liter separable flask provided with a stirrer, a reflux condenser, a thermometer and a gas introducing pipe. After esterification was performed at 210°–215° C. in an atmosphere of nitrogen gas to obtain a polyester having an acid value of 6.9 and a number average molecular weight of 7,400, glycol elimination was performed at 220°–225° C. for 6 hours while the pressure was reduced to 0.5–0.6 Torr.

The thus-obtained polyester (1) was a light ivory-color wax-like substance having a melting point of about 72°–73° C., a number average molecular weight of 31,400 and a weight average molecular weight of 95,200. The Mw/Mn was about 3.0. 500 g of the polyester (1) was heated to 200°–205° C. and melted in a heating kneader, and 7 g of xylylene, diisocyanate (1.4 phr) was added to the melt while the melt was being kneaded. As a result, the viscosity rapidly increased, but no gelation occurred.

The thus-obtained polyester (L) having a branched structure and urethane bonds was a yellowish brown wax-like substance and had a melting point of 77°–78° C., a number average molecular weight of 46,200 and a weight average molecular weight of 336,000. Therefore, the Mw/Mn was about 7.2.

As a result of melt flow measurement under the conditions where the amount of a sample was 5 g, the temperature was 190° C. and the load was 2.16 kg, the polyester (L) was eluted at 0.01 g/10 minutes or less, that is, practically none of the polyester (L) was eluted, whereas the polyester (1) was eluted at 3.6 g/10 min.

The polyester (L) was press-formed at 170° C. into a film having a thickness of 75–80μ, and then stretched by five times at 50° C. The resultant film had a tensile strength of 12.8 Kg/mm$^2$. The elongation rate was 90–100%.

On the other hand, a film press-formed of the polyester (1) in generally the same manner as above ruptured while being stretched. Thus, a desired film could not be obtained.

EXAMPLE 13

205 g of ethylene glycol, 354 g of succinic acid, 9 g of trimellitic anhydride (1.5 mol % of the amount of the succinic acid), and. 0.06 g of tetraisopropyl titanate (about 100 ppm titanium metal) were placed in a 1-liter separable flask provided with a stirrer, a reflux condenser, a thermometer and a gas introducing pipe. After esterification was performed at 200°–205° C. in an atmosphere of nitrogen gas to achieve an acid value of 5.9, glycol elimination was performed at 220° C. for 3.5 hours while the pressure was reduced to 0.5–0.6 Torr.

The thus-obtained polyester (m) was a white wax-like substance having a melting point of about 98° C., a number average molecular weight of 27,400 and a weight average molecular weight of 75,600.

300 g of the polyester (m) was melted at 205° C., and 3 g of hexamethylene diisocyanate was melt-blended with the polyester (m). As a result, the viscosity rapidly increased, but no gelation occurred.

The thus-obtained high molecular weight aliphatic polyester (M) according to the present invention was a light yellow wax-like substance and had a melting point of 97°–98° C., a number average molecular weight of 43,900 and a weight average molecular weight of 288,000 and, therefore, the Mw/Mn=6.5. This indicates a widened molecular weight distribution and, therefore, good film formability.

As a result of melt flow measurement according to the JIS-K-7210A method, when the load was 0.325 kg, the high molecular weight aliphatic polyester (M) according to the present invention was eluted only at 3.51 g/10 minutes or less whereas the entire amount of the polyester (m) was eluted.

The high molecular weight aliphatic polyester (M) was press-formed into a film having a thickness of 75–80μ, and then stretched by three times. The resultant film had a tensile strength of 13.6 Kg/mm$^2$, and was very tough. It was confirmed that the high molecular weight aliphatic polyester (M) was biodegradable. Further, it was confirmed that film blowing formation of the high molecular weight aliphatic polyester was possible.

EXAMPLE 14

300 g of 1,4-butanediol, 283 g of succinic acid, 88 g of adipic acid, 6 g of trimellitic anhydride (1 mol % of the total amount of the succinic acid and the adipic acid), and 0.08 g titanium oxyacetylacetonate (the Ti content being 29 ppm) were placed in a 1-liter separable flask provided with a stirrer, a reflux condenser, a thermometer and a gas introducing pipe. After esterification was performed at 205°–210° C. in an atmosphere of nitrogen gas to achieve an acid value of 4.7, glycol elimination was performed at 215°–220° C. for 3 hours while the pressure was reduced to 0.5–0.6 Torr, thus obtaining a white wax-like polyester (n) having a melting point of about 86°–87° C., a number average molecular weight of 27,900 and a weight average molecular weight of 86,900.

500 g of the polyester (n) was melted at 210° C., and 6 g of isophorone diisocyanate was added thereto. As a result, the viscosity rapidly increased, but no gelation occurred.

The thus-obtained high molecular weight aliphatic polyester (N) according to the present invention was a light yellow wax-like substance and had a melting point of 89°–90° C., a number average molecular weight of 43,300 and a weight average molecular weight of 307,6000 and, therefore, the Mw/Mn=7.1.

As a result of the melt flow measurement according to the JIS-K-7210A method under the condition where the load was 2.16 kg, the amount of elution was only 0.01 g/10 minutes or smaller.

The high molecular weight aliphatic polyester (N) was press-formed into a film having a thickness of 75-8082 , and then uniaxially stretched by three times. The resultant film had a tensile strength of 14.7–16.9 Kg/mm$^2$, and was very tough.

EXAMPLE 15

205 g of ethylene glycol, 354 g, of succinic acid, 6 g of pyromellitic anhydride (0.9 mol % of the amount of the-succinic acid) and 0.06 g of tetraisopropyl titanate (about 100 ppm titanium metal) were placed in a 1-liter separable flask provided with a stirrer, a reflux condenser, a thermometer and a gas introducing pipe. After esterification was performed at 200°–205° C. in an atmosphere of nitrogen gas to achieve an acid value of 3.1, glycol elimination was performed at 220° C. for 2.5 hours while the pressure was reduced to 0.5–0.6 Torr.

The thus-obtained polyester (o) was a white wax-like substance having a melting point of about 95°–95° C., a number average molecular weight of 25,800 and a weight average molecular weight of 69,660.

300 g of the polyester (o) was melted at 205° C., and 3.8 g of hexamethylene diisocyanate was melt-blended. As a result, the viscosity rapidly increased, but no gelation occurred.

The thus-obtained high molecular weight aliphatic polyester (O) according to the present invention was a light yellow wax-like substance and had a melting point of 97°–98° C., a number average molecular weight of 43,100 and a weight average molecular weight of 299,000 and, therefore, the Mw/Mn=6.9.

This indicates a widened molecular weight distribution and, therefore, good film formability.

As a result of melt flow measurement according to the JIS-K-7210A method, when the load was 0.325 kg, the high molecular weight aliphatic polyester (O) according to the present invention was eluted only at 2.99 g/10 minutes or less whereas the entire amount of the polyester (o) was eluted.

The high molecular weight aliphatic polyester (O) was press-formed into a film having a thickness of 75–80μ, and then stretched by three times. The resultant film had a tensile strength of 14.1Kg/mm², and was very tough. It was confirmed that the high molecular weight aliphatic polyester (O) was biodegradable.

Further, it was confirmed that film blowing formation of the high molecular weight aliphatic polyester was possible.

EXAMPLE 16

300 g of 1,4-butanediol, 283 g of succinic acid, 88 g of adipic acid, 10 g of benzophenone tetracarboxylic anhydride (about 1 mol % of the total amount of the succinic acid and the adipic acid), and 0.08 g of titanium oxyacetylacetonate (the Ti content being 29 ppm) were placed in a 1-liter separable flask provided with a stirrer, a reflux condenser, a thermometer and a gas introducing pipe. After esterification was performed at 205°–210° C. in an atmosphere of nitrogen gas to achieve an acid value of 6.4, glycol elimination was performed at 215°–220° C. for 2 hours while the pressure was reduced to 0.5–0.6 Torr, thus obtaining a white wax-like polyester (p) having a melting point of about 86°–87° C., a number average molecular weight of 28,400 and a weight average molecular weight of 88,100.

500 g of the polyester (p) was melted at 210° C., and 6 g of isophorone diisocyanate was added thereto. As a result, the viscosity rapidly increased, but no gelation occurred.

The thus-obtained high molecular weight aliphatic polyester (P) according to the present invention was a light yellow wax-like substance and had a melting point of about 89° C., a number average molecular weight of 44,100 and a weight average molecular weight of 326,000 and, therefore, the Mw/Mn=7.6.

As a result of melt flow measurement according to the JIS-K-7210A method under the condition where the load was 2.16 kg, the amount of elution was only 0.01 g/10 Minutes or smaller, that is, practically no elution was observed.

The high molecular weight aliphatic polyester (N) was formed into a film having a thickness of 75–80μ. in generally the same manner as in Example 15, and then uniaxially stretched by five times. The resultant film had a tensile strength of 15.5–18.1 Kg/mm², and was very tough.

INDUSTRIAL APPLICABILITY

The present invention provides a method for producing an aliphatic polyester which has good properties and melt viscosity required for molding and forming and is applicable to a wide variety of fields, such as films, moldings and formings, fibers, etc.

What is claimed is:

1. A method for producing a high molecular weight aliphatic polyester, the method being characterized by reacting:
   (A) 100 parts by weight of a polyester (a) with a number average molecular weight of at least 20,000, and a weight average molecular weight of at least 60,000, and with end-groups that are substantially hydroxyl groups, and with a melting point of at least 60° C., the polyester (a) having been obtained by reacting the following three ingredients:
   (i) a glycol ingredient;
   (ii) an aliphatic or alicyclic dicarboxcylic acid or an anhydride thereof; and
   (iii) at least one polyfunctional ingredient selected from the group consisting of trifunctional and tetrafunctional polyhydricalcohols, oxycarboxylic acids and polybasiccarboxylic acids or acid anhydrides thereof;
   with
   (B) 0.1–3 parts by weight of a poly-isocyanate, in a melt state at a temperature equal to or higher than the melting point of the polyester (a).

2. A method for producing a high molecular weight aliphatic polyester, the method being characterized by reacting:
   (A) 100 parts by weight of a polyester (a) with a number average molecular weight of at least 20,000, and a weight average molecular weight of at least 60,000, and with end-groups that are substantially hydroxyl groups, and with a melting point of at least 60° C, the polyester (a) having been obtained by esterification of the following three ingredients:
   (i) a glycol ingredient;
   (ii) an aliphatic or alicycli dicarboxcylic acid or an anhydride thereof; and
   (iii) at least one polyfunctional ingredient selected from the group consisting of trifunctional and tetrafunctional polyhydricalcohols, oxycarboxylic acids and polybasiccarboxylic acids, followed by a glycol elimination reaction under a reduced pressure in the presence of a catalyst composed of an organic compound of titanium;
   with
   (B) 0.1–3 parts by weight of a poly-isocyanate, in a melt state at a temperature equal to or higher than the melting point of the polyester (a).

3. A method according to claim 1 or 2, wherein the ratio Mw/Mn of the weight average molecular weight of the high molecular weight aliphatic polyester to the number average molecular weight thereof is at least 3.

4. A method according to claim 1 to 2, wherein the amount of the polyfunctional ingredient (iii) used is as follows:
   when the trifunctional ingredient is used the amount thereof is 0.1–5 mol %; and
   when the tetrafunctional ingredient is used the amount thereof is 0.1–3 mol %, with respect to the amount of either of the glycol ingredient or the aliphatic dicarboxylic acid or an acid anhydride thereof, which is defined as 100 mol %.

5. A method according to claim 1 or 2, wherein the trifunctional ingredient of the polyfunctional ingredient (iii) is selected from the group consisting of trimethylolpropane, glycerine, malic acid, and trimellitic anhydride.

6. A method according to claim 1 or 2, wherein the tetrafunctional ingredient of the polyfunctional ingredient (iii) is selected from the group consisting of pentaerythritol, citric acid, tartaric acid, pyromellitic anhydride, benzophenonetetracarboxylic anhydride, and cyclopentanetetracarboxylic anhydride.

7. A film formed of a high molecular weight aliphatic polyester produced by a method as defined in claim 1 or 2.

* * * * *